United States Patent [19]

Sugita

[11] Patent Number: 6,075,778
[45] Date of Patent: Jun. 13, 2000

[54] RADIO COMMUNICATION SYSTEM, METHOD OF RADIO COMMUNICATION FOR INFORMATION PROVISION SERVICE, AND MOBILE RADIO STATION

[75] Inventor: Takehiro Sugita, Kanagawa, Japan

[73] Assignee: Sony Corporation, Tokyo, Japan

[21] Appl. No.: 08/867,690

[22] Filed: Jun. 3, 1997

[30] Foreign Application Priority Data

Jun. 4, 1996 [JP] Japan ................................. 8-163789

[51] Int. Cl.[7] ........................... G01R 31/08; G06F 11/00; G08C 15/00; H04B 1/28
[52] U.S. Cl. ........................ 370/335; 370/252; 370/313; 455/517; 455/524
[58] Field of Search .................... 370/252, 342, 370/479, 335, 320, 441, 329, 331, 343, 313; 455/574, 566, 31, 438, 452, 517, 524; 395/200.61, 200.77

[56] References Cited

U.S. PATENT DOCUMENTS

| 5,410,588 | 4/1995 | Ito ............................................ 379/58 |
| 5,655,218 | 8/1997 | Smolinske ............................... 455/566 |
| 5,721,733 | 2/1998 | Wang et al. ............................. 370/332 |
| 5,742,592 | 4/1998 | Scholefield et al. .................... 370/329 |
| 5,774,671 | 6/1998 | Satoh ...................................... 395/200 |
| 5,781,541 | 7/1998 | Schneider ............................... 370/335 |
| 5,842,141 | 11/1998 | Vaihoja et al. .......................... 455/574 |
| 5,850,527 | 12/1998 | Suzuki ................................ 395/200.77 |

Primary Examiner—Huy D. Vu
Assistant Examiner—Man Phan
Attorney, Agent, or Firm—Jay H. Maioli

[57] ABSTRACT

A mobile radio station radio-communicates with a base station in accordance with a code division multiple access scheme to receive an information provision service from an information service center through the base station. The information service center supplies information data for information service, type data indicating the type of information data, and update data including version data of the information data to the base station. The mobile radio station receives the update data transmitted from the base station and displays the type data on a display, when the desired selected type data is selected from the displayed type data by user's operation, if it is judged that the corresponding information data is the latest information data based on the version data corresponding to the selected type data, receives the information data. When the information data is the latest information data, the information service center charges an account for the reception of information data by the mobile radio station.

14 Claims, 8 Drawing Sheets

RADIO COMMUNICATION SYSTEM, METHOD OF RADIO COMMUNICATION FOR INFORMATION PROVISION SERVICE, AND MOBILE RADIO STATION

BACKGROUND OF THE INVENTION

1. Field of the Invention

This invention relates to a radio communication system, a method of radio communication for information provision service, and a mobile radio station, and more particularly, is suitably applied to a code division multiple access (CDMA) cellular system.

2. Description of the Related Art

A cellular system is intended to provide communication services, so that the cellular system does not have sufficient communication capacity to provide services other than communication services. For this reason, data transmission using the cellular system, like facsimile transmission and computer communications using modems, is personally performed only by individual users, therefore information provision services for providing a variety of information from a cellular network have not been particularly performed.

In the United States, a cellular system in accordance with a CDMA scheme have been standardized, and services are going to be inaugurated. The CDMA scheme has also been adopted in a new mobile communication system such as a personal communication service (PCS) and has its position substantially established as a predominant scheme of the next generation in the United States.

The CDMA scheme is characterized by its very large communication capacity as compared with a conventional frequency division multiple access (FDMA) scheme or the like. In the future, one half or more of a 25 [MHz] frequency band assigned to an existing cellular system and a 60 [MHz] frequency band assigned to the PCS system is going to be operated in accordance with the CDMA scheme, whereby it is thought that the CDMA scheme can ensure approximately tenfold communication capacity as compared with that of the conventional schemes. Therefore, in the CDMA cellular system, the essential communication services do not occupy all of the assigned frequency bands, so that highly value added services such as information provision services can be provided.

The CDMA scheme comparatively has large communication capacity, however, the communication capacity of the CDMA scheme is small as compared with that of a wire communication network. This is because the wire network can easily increase the communication capacity only by increasing cables, whereas the CDMA scheme has a limitation in the number of multiplexed codes as well as a limitation in terms of the frequency band. Thus, even with a cellular system in accordance with the CDMA scheme, an efficient service provision must be attempted for its practice.

Also, in order to spread information provision services, it is desirable to increase the amount of information available with the same frequency to conduct efficient service provisions. Further, it is desirable for users that such services provide a good usability.

SUMMARY OF THE INVENTION

In view of the foregoing, an object of the present invention is to provide a radio communication system, a method of radio communication for information provision service, and a mobile radio station which are useable for users and can efficiently perform information provision service.

The foregoing object and other objects of the invention have been achieved by the provision of a mobile radio station which communicates with a base station by radio with a code division multiple access and receives information provision services from an information service center through the base station. The information service center supplies information data for information services, type data indicating the type of the information data, and update data including version data of the information data to the base station. The mobile radio station receives the update data transmitted from the base station to display the type data on a display means, and then when a user selects desired one data from the displayed type data by operation, in the case where it is judged based on version data corresponding to the selected type data that the corresponding information data is the latest information data, receives the information data. The information service center performs an account processing for receiving the information data by the mobile radio station.

Further, in the present invention, information data which is frequently received is repeatedly transmitted, when the mobile radio station judges that the information data is the latest information data, the mobile radio station receives the information data being transmitted and transmits an information receiving report including identification information to the information service center through the base station. The information service center performs the account processing on the basis of the information receiving report.

On the other hand, information data which is not frequently received is not usually transmitted, when the mobile radio station judges that the information data is the latest information data, the base station is required that the mobile radio station connects with the information service center, after connecting, the information service center transmits the information data in response to an information transmission requirement including the identification information from a radio communication terminal and performs the account processing on the basis of the information transmission requirement.

The nature, principle and utility of the invention will become apparent from the following detailed description when read in conjunction with the accompanying drawings in which like parts are designated by like reference numerals or characters.

DETAILED DESCRIPTION OF THE EMBODIMENT

Preferred embodiment of the present invention will be described with reference to the accompanying drawings:

In a conventional wire telephone network, information provision services can be available through a point-to-point communication. However, this method is inefficient for providing information required by many people. For example, each person occupies one line for receiving weather forecast, time, stock information, and so on, so that the information provision service suffers from a low efficiency.

On the other hand, since a cellular system is built with a radio network, the same information can be provided to many people at a time only by providing a common radio channel.

Thus, this embodiment makes the most of advantages of such cellular system and advantages of the CDMA scheme in which a communication capacity can be increased, to realize an efficient information provision service.

Figure 1:
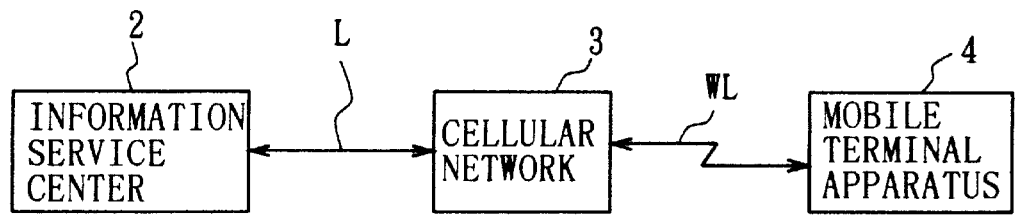
FIG. 1 is a block diagram showing the configuration of an information provision system according to one embodiment of the present invention.

The whole configuration of an information provision system 1 will be described with reference to FIG. 1. The information provision system 1 is composed of an information service center 2 to be an information providing source for implementing the information provision service, a cellular network 3 connected to the information service center 2 through a wire line L to build a communication network, and a mobile terminal apparatus 4 connected to the cellular network 3 through a radio line WL.

The information provision service center 2 always accumulates information useful for users, such as news, weather forecast, and stock information. Such information is periodically updated, so that the information provision service center 2 always has the latest information.

The cellular network 3 comprises a control station apparatus and a plurality of base station apparatuses to form a communication network using radio communications in accordance with the CDMA scheme.

The mobile terminal apparatus 4 is, for example, a portable telephone as a mobile communication terminal apparatus carried by a user. The mobile terminal apparatus 4 communicates with a base station apparatus in the cellular network 3 through the radio network WL to make a call with another portable telephone through the cellular network 3, and connects to the information service center 2 through the cellular network 3 and the wire line L to receive a variety of provided information.

The information provision system 1 has two methods for providing information to the mobile terminal apparatus 4. In a first method, information to be provided is repeatedly transmitted by using a portion of a code channel which is transmitted by the base station apparatus in the cellular network 3, thereby the mobile terminal apparatus is provided with the information. In second method, after connecting the information provision system 1 with the mobile terminal apparatus 4 by a line through the cellular network 3, the mobile terminal apparatus 4 is provided with the information.

Figure 2A:
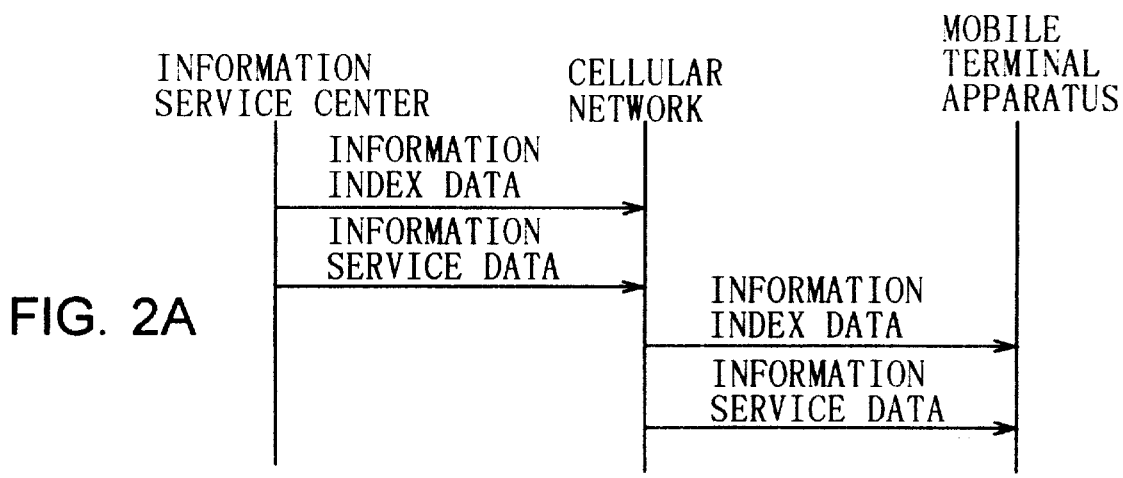
FIGS. 2A and 2B are sequence charts explaining methods of providing information in the information provision system.

For example, in the first information providing method, information is provided along a flow of information shown in FIG. 2A. First, the information service center 2 transmits information index data and information service data to the cellular network 3. In this event, the information index data includes data indicating the type of the information being provided and data indicating whether or not each of the information being provided has been updated (update information), and the information service data is data of essential information to be provided such as weather forecast and stock information.

In the cellular network 3 which has received the information index data and the information service data, the base station apparatuses transmit the information index data and the information service data on radio waves. More specifically, each of the base station apparatuses repeatedly transmits the information index data at a predetermined cycle using a paging channel and repeatedly transmits the information service data using a code channel for information provision (hereinafter, referred to as "information service channel").

The mobile terminal apparatus 4 receives the information index data which is transmitted from the base station apparatus in the cellular network 3, and displays items indicating the type of the information being provided on a display means. When there is an item of user's desired information (for example, stock information) in the displayed items, the user inputs an instruction to the mobile terminal apparatus 4 to select the item of the desired information. The mobile terminal apparatus 4, upon receiving the instruction, receives the information service data which is transmitted through the information service channel, and then displays the received information service data on the display means. In this way, the user can see the instructed information. The mobile terminal apparatus 4 stores the received information service data in a predetermined storage means. If it is revealed from the information index data that the instructed information has not been updated when a display instruction is inputted, the information service data is read out from the storage means to be displayed on the display means. In this way, the information can be displayed without performing receiving operations, thus eliminating useless receiving operations.

Figure 2B:
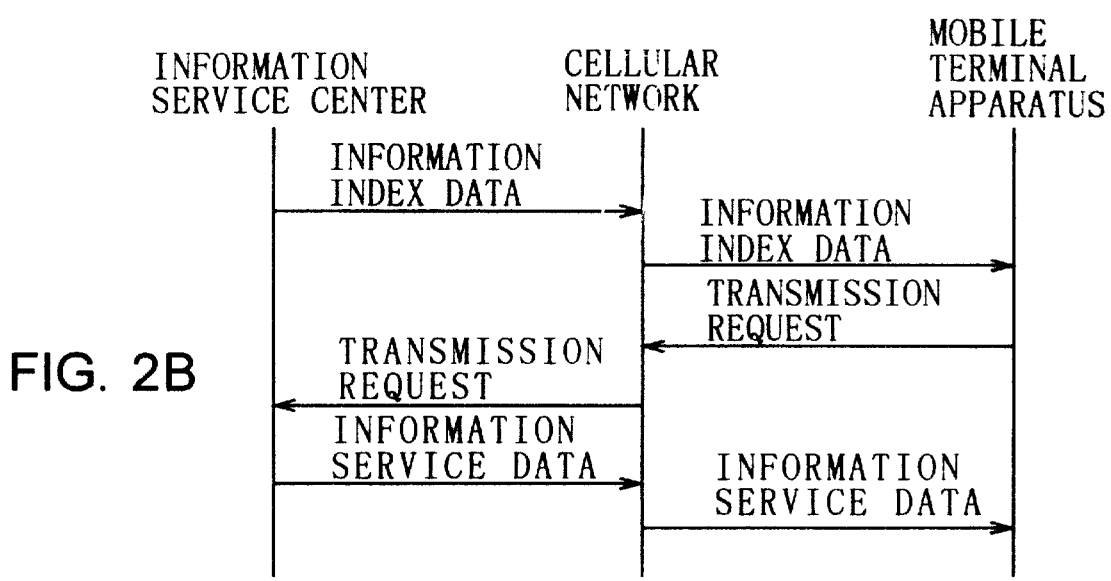

On the other hand, in the second information providing method, information is provided along a flow of information shown in FIG. 2B. Specifically, in the second information providing method, only the aforementioned information index data is transmitted from the information service center 2 to the cellular network 3. The cellular network 3, upon receiving the information index data, transmits the information index data from the base station apparatuses using paging channels.

The mobile terminal apparatus 4 receives the information index data which is transmitted from the base station apparatus and displays the received information index data on a predetermined display means. When the user, viewing the display, desires to know predetermined information, the user inputs an instruction to the mobile terminal apparatus 4 to display the desired information. The mobile terminal apparatus 4, upon receiving the instruction, establishes a communication line with the information service center 2 through the cellular network 3, and transmits an information transmission request to the information service center 2 through the communication line. The information service center 2, upon receiving the information transmission request, transmits the instructed information through the communication line as information service data. In this way, the mobile terminal apparatus 4 can receive and display the information instructed by the user.

Also, in the second information providing method, the mobile terminal apparatus 4 stores the received information service data in the predetermined storage means. If it is revealed from the information index data that the instructed information has not been updated when the display instruction is inputted, the information service data is read out from the storage means to be displayed on the display means. In this way, useless receiving operations can be eliminated likewise.

In this connection, the first and second information providing methods are separately explained for convenience of explanation, however, these methods are not completely separated in actual as described above. Specifically, in the case of the information provision system 1, the information index data includes identification information for identifying whether information to be provided is repeatedly transmitted using an information service channel or transmitted through a line connected to the information service center 2 (i.e., identification information for identifying an information providing method), and the information index data is repeatedly transmitted using the paging channel. The mobile terminal apparatus 4 checks based on the received information index data that the instructed information is provided by which of the methods when the user inputs a display instruction. The instructed information is acquired by receiving the information service channel when provided by the first information providing method, whereas the instructed information is acquired through a line connected to the information service center 2 when provided by the second information providing method.

Note that, in the information provision system 1, information which is frequently received is repeatedly transmitted using a dedicated information service channel, while information which is frequently received is transmitted through a line connected to the information service center 2. This is because if the information which is not frequently received is repeatedly transmitted using a dedicated code channel, the code channel is uselessly occupied to cause a lower line utilization efficiency. Further, if the information which is frequently received is transmitted through a line connected to the information service center 2, a traffic channel is excessively occupied by the information provision service to adversely affect the essential call service. To avoid such problems, the information provision system 1 changes the information providing method in accordance with a receiving frequency of information, thus realizing an efficient information provision service with a highly efficient use of the radio line.

Figure 3:
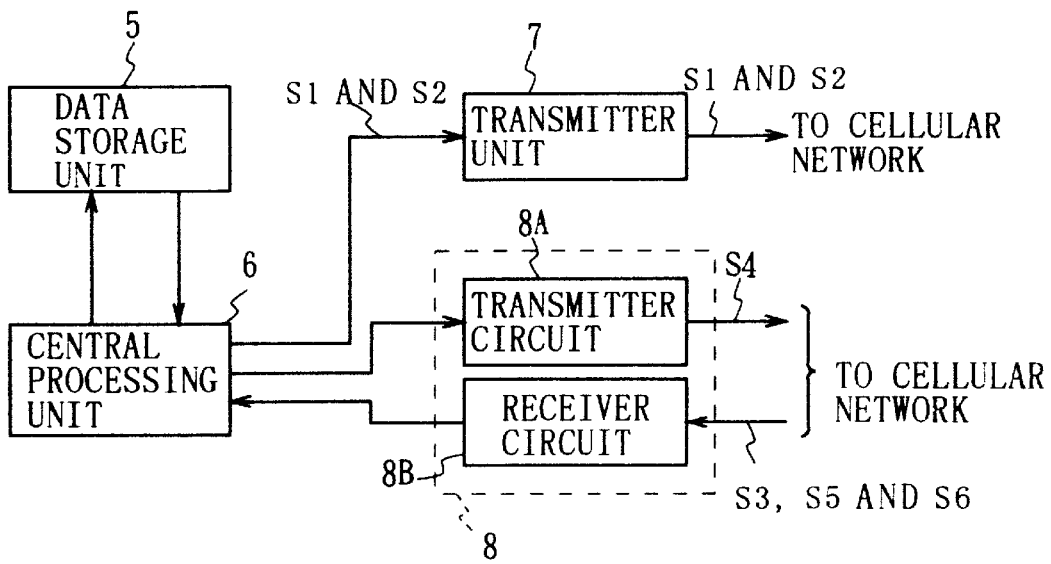
FIG. 3 is a block diagram showing the configuration of an information service center.

Next, the specific configurations of the respective apparatuses will be described below. First, the information service center 2 comprises a data storage unit 5, a central processing unit 6, a transmitter unit 7, and a transceiver unit 8, as shown in FIG. 3.

The data storage unit 5 forms a database for managing and accumulating a variety of information, and totals and stores information which is provided to subscribers, update history of the information, identification numbers of the subscribers, the contents of services provided to respective subscribers, account information, and so on. Specifically, the information which is provided to the subscribers includes, for example, news, weather forecast, and stock information, which conforms to the needs of subscribers. Further, the above information is periodically updated so that the latest information is always accumulated. The data storage unit 5 manages that which of the aforementioned information providing methods is employed for providing information.

The central processing unit 6 controls the entire operation of the information service center 2 including information provision, account management, and so on. The central processing unit 6 reads an update history of information, a providing method of information, and so on from the data storage unit 5, and creates information index data S1 based on the read data to supply it to the transmitter unit 7. The central processing unit 6 also reads information which is repeatedly transmitted through an information service channel, out of information to be provided, and supplies the read information to the transmitter unit 7 as information service data S2.

When the central processing unit 6 connects with the mobile terminal apparatus 4 through the cellular network 3, the central processing unit 6 receives a transmission request S3 from the mobile terminal apparatus 4 through the transceiver unit 8, reads requested information from the data storage unit 5 in response to the transmission request S3, and transmits the requested information as information service data S4 to the mobile terminal apparatus 4 through the transceiver unit 8.

The transmitter unit 7, which corresponds to an interface with the cellular network 3, receives from the central processing unit 6 the information index data S1 and the information service data S2 which are repeatedly transmitted from a base station apparatus in the cellular network 3, and transmits the information index data S1 and the information service data S2 to the cellular network 3 with a predetermined signal form.

Similarly, the transceiver unit 8, which corresponds to the interface with the cellular network 3, transmits and receives the information service data S4 and the transmission request 53 nd so on when the transceiver unit 8 connects with the mobile terminal apparatus 4 through the cellular network 3. The transceiver unit 8 comprises a transmitter circuit 8A and a receiver circuit 8B, wherein the transmitter circuit 8A transmits the information service data S4 to the cellular network 3 with the predetermined signal form, and the receiver circuit 8B receives the transmission request S3, the identification number S5, and the information acquisition report S6 transmitted through the cellular network 3 to pass the received data to the central processing unit 6.

When information is received by the mobile terminal apparatus 4 through an information service channel, the central processing unit 6 receives the identification number S5 of a subscriber and the information acquisition report S6 transmitted from the mobile terminal apparatus 4 through the transceiver unit 8, and charges account to the subscriber, who has received the information through the information service channel, based on the data S5 and S6. The central processing unit 6, when providing information through a line connection, receives the identification number S5 of a subscriber transmitted from the mobile terminal apparatus 4 through the transceiver unit 8, and charges account to the subscriber, who has received the information, based on the identification number S5.

Figure 4:
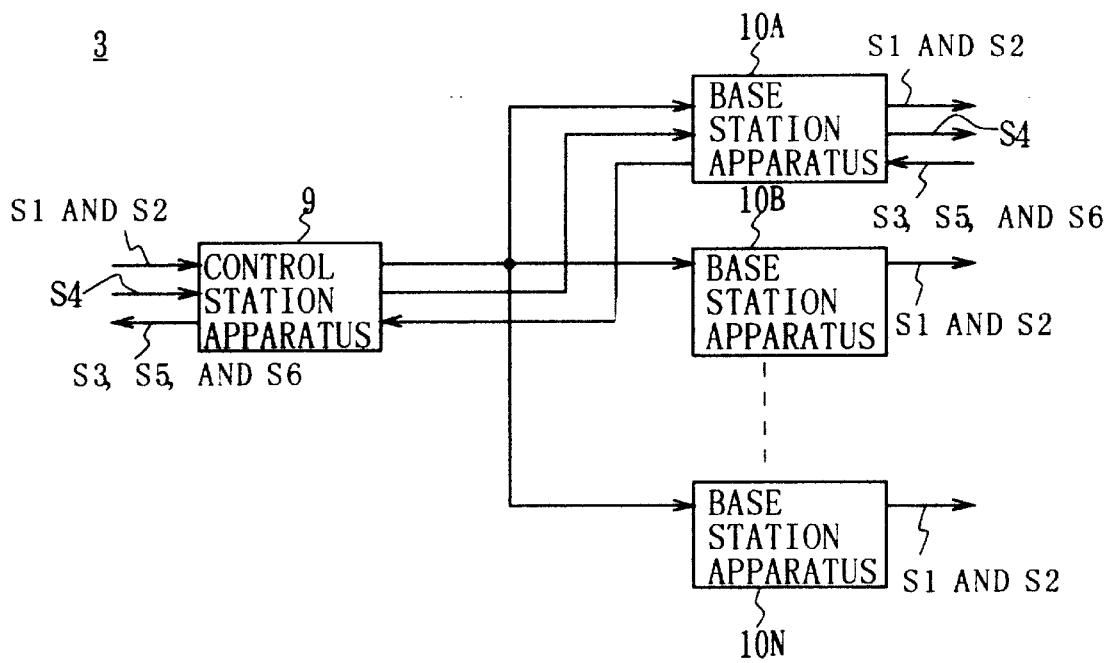
FIG. 4 is a block diagram showing the configuration of a cellular network.

Next, the configuration of the cellular network 3 will be next described with reference to FIG. 4. As shown in FIG. 4, the cellular network 3 is composed of a control station apparatus 9 and a plurality of base station apparatuses 10A to 10N.

The control station apparatus 9 controls the entire operation of the cellular network 3, and controls the operation of an information provision service in addition to the operation of a normal communication service. For example, in the communication service, the control station apparatus 9, upon receiving a transmission request from the mobile terminal apparatus 4, instructs the nearest base station apparatus to make a line connection, in order to establish a radio line between the mobile terminal apparatus 4 and the base station apparatus and establish a communication line between the base station apparatus and a call destination. Thereby, the mobile terminal apparatus 4 can make a call with the destination through the radio line and the communication line. Also, when a call request is received from another telephone to the mobile terminal apparatus 4, a base station apparatus transmits a call signal. The control station apparatus 9, upon receiving a response signal from the mobile terminal apparatus 4, establishes a radio line between the base station apparatus and the mobile terminal apparatus 4 in response to the response signal, and establishes a communication line between the base station apparatus and the other telephone. Thereby, the mobile terminal apparatus 4 can make a call with the other telephone.

In the case of the information provision service, the control station apparatus 9 receives the information index data Si and the information service data S2 transmitted from the information service center 2 to supply the received data to the respective base station apparatuses 10A to 10N. Each of the base station apparatuses 10A to 10N, upon receiving the data S1 and S2, repeatedly transmits the information index data S1 using a paging channel, and repeatedly transmits the information service data S2 using a dedicated information service channel.

Further, in the case of providing information through a line connection, the control station apparatus 9, upon receiving a transmission request from the mobile terminal apparatus 4, first instructs the nearest base station apparatus, for example, the base station apparatus 10A to make a line connection. Thereby, a radio line is established through a traffic channel between the base station apparatus 10A and the mobile terminal apparatus 4, and a communication line is established between the base station apparatus 10A and the information service center 2. Next, the control station apparatus 9 receives the transmission request S3 transmitted from the mobile terminal apparatus 4 through the base station apparatus 10A, and transfers the transmission request S3 to the information service center 2. The control station apparatus 9 also receives information service data S4 transmitted from the information service center 2 in response to the transmission request S3, and transfers the information service data S4 to the mobile terminal apparatus 4 through the base station apparatus 10A. In this connection, the control station apparatus 9 receives the identification number S5 and the information acquisition report S6, transmitted from the mobile terminal apparatus 4 for the account processing, through the base station apparatus 10A, and transfers the data S5 and S6 to the information service center 2.

Now, the respective base station apparatuses 10A to 10N will be described. In a general cellular network in accordance with the CDMA scheme, a plurality of code channels for transmitting by respective base station apparatuses are multiplexed using the same frequency channel. For the code channels, a forward link (in the direction from the base station apparatus to the mobile terminal apparatus) is provided with four kinds of code channels: a pilot channel, a sync channel, a paging channel, and a traffic channel.

Out of the aforementioned four channels, the pilot channel is a channel for repeatedly transmitting a pseudo noise code (PN code) excluding data, and is used for acquisition and maintenance of synchronization, reconstruction of a clock, and so on at a mobile terminal apparatus. The synch channel is a channel used to match time information and a long-period PN code between a base station apparatus and a mobile terminal apparatus. The paging channel is a channel used for transmitting information required for hand-off, terminal calling information generated when a call reaches a terminal, information on assignment of a traffic channel, and so on. The traffic channel is a channel for transmitting speech data during a call, information data during data transmission, and so on.

Compared to such general CDMA cellular network, this embodiment uses the paging channel to repeatedly transmit the information index data S1 as described above. In addition, the information service data S2 is repeatedly transmitted using the information service channel which is a dedicated code channel. For this reason, the cellular network 3 according to this embodiment is newly provided with the information service channel, using part of a code channel.

Figure 5:
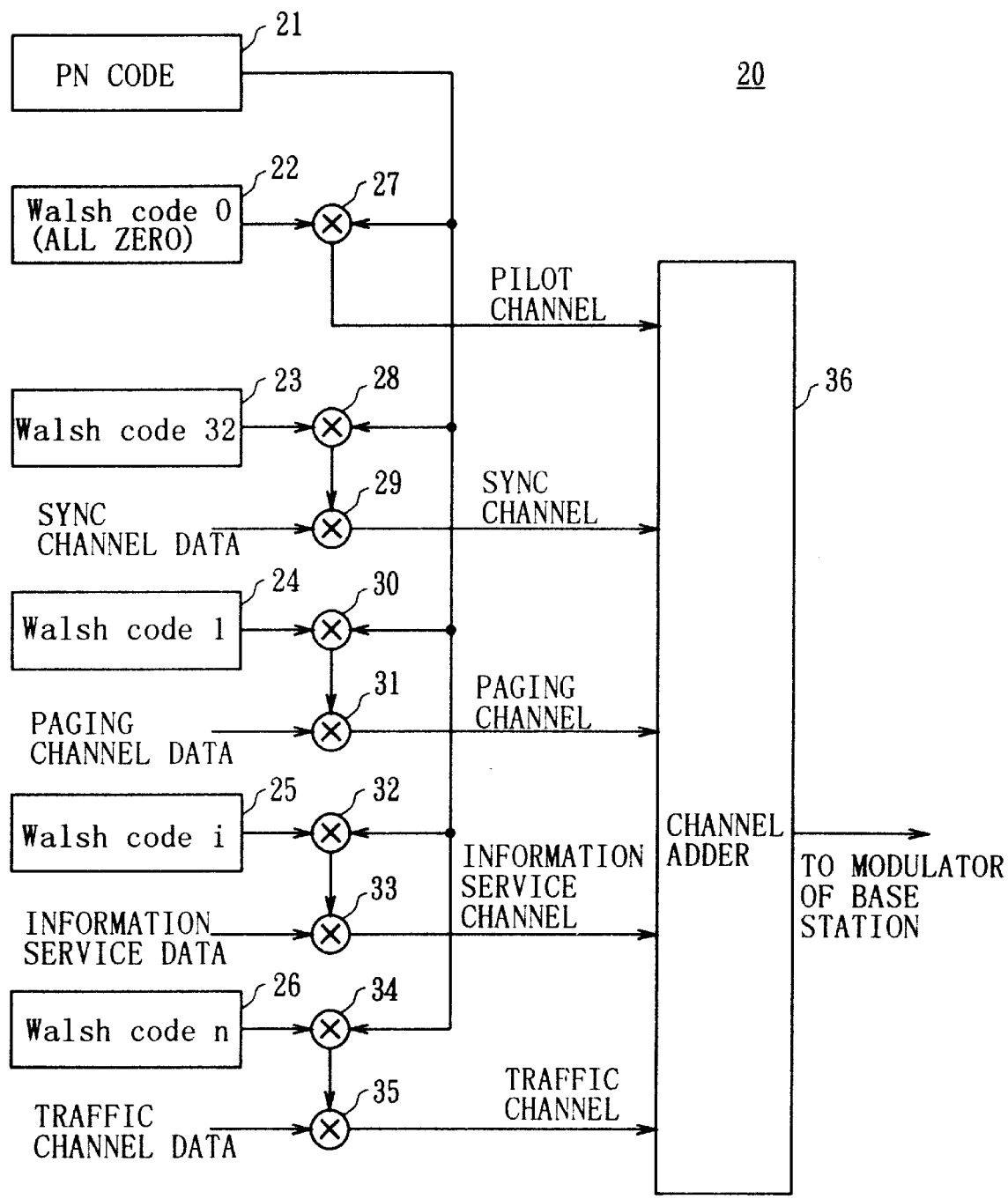
FIG. 5 is a block diagram showing a transmitter unit of a base station apparatus.

Here, a transmitter unit of the base station apparatus in this embodiment will be described with reference to FIG. 5. Each of the base station apparatuses 10A to 10N is provided with a transmitter unit 20 as shown in FIG. 5.

In the transmitter unit 20, code channels, each generated by multiplying each code channel data by a different spread code (specifically, exclusive OR operation), are added by a channel adder 36 to multiplex the code channels which are finally transmitted through the same frequency channel. In this event, a code generated by multiplying a PN code by a Walsh code is used as the spread code. The spread code is changed by varying the Walsh code as "0", "32", "1", "i", and "n" for each code channel.

For example, as to the traffic channel, a PN code generated at a PN code generator 21 is multiplied by a Walsh code having a function number "n" generated at a Walsh code generator 26 by using a multiplier 34, and the resulting code is used as a spread code. Then, this spread code is multiplied by traffic channel data by a multiplier 35 to generate the traffic channel. As to the information service channel, the PN code is multiplied by a Walsh code having a function number "i" generated at a Walsh code generator 25 by using a multiplier 32, and the resulting code is used as a spread code. Then, this spread code is multiplied by information service data by a multiplier 33 to generate the information service channel. As to the paging channel, the PN code is multiplied by a Walsh code having a function number "1" generated at a Walsh code generator 24 by using a multiplier 30, and the resulting code is used as a spread code. Then, this spread code is multiplied by paging channel data by a multiplier 31 to generate the paging channel. As to the sync channel, the PN code is multiplied by a Walsh code having a function number "32" generated by a Walsh code generator 23 by using a multiplier 28, and the resulting code is used as a spread code. Then, this spread code is multiplied by sync channel data by a multiplier 29 to generate the sync channel.

However, as to the pilot channel, the PN code is multiplied by a Walsh code having a function number "0" (i.e., a code always at "0") generated at a Walsh code generator 22 by using a multiplier 27, and the resulting code is transmitted as it is as a spread code. Thus, the PN code is transmitted as it is on the pilot channel. Therefore, the detection of the PN code by the mobile terminal apparatus 4 means the examination of the timing of the spread code which is transmitted using the pilot channel. Also, the mobile terminal apparatus 4 can demodulate desired code channel data by selectively switching a spread code generated at the PN code generator in accordance with the transmitter side (however, the pilot channel is not a channel through which data is provided, as can be understood from the aforementioned description).

Figure 6:
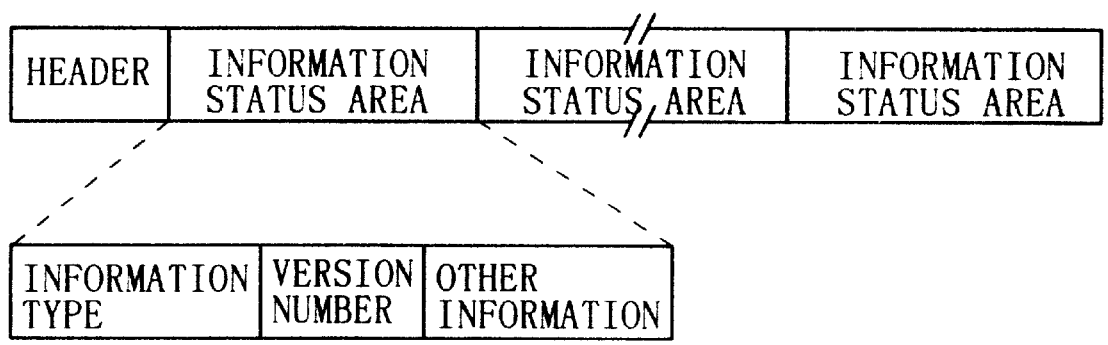
FIG. 6 is a schematic diagram showing the structure of an information index packet.

Note that, the information index data S1 is inserted into paging channel data with the packet data form shown in FIG. 6 to be transmitted. In this event, the information index packet is formed of a header and one or a plurality of information status areas. The information status area corresponds to the information index data S1. The information status area comprises an information type field, a version number field, and another information field as shown in FIG. 6. The information type field contains a code indicative of provided information which is related to the information status. The version number field contains a code indicative of an update history of provided information. The other information field contains a code related to a code channel through which information service data is transmitted (specifically, a code for identifying whether information service data is transmitted through an information service channel being a dedicated code channel, or through a traffic channel through a line connection). Note that, when the information service data is transmitted through a dedicated code channel, the other information field contains a code indicative of the channel number of the code channel.

Figure 7:
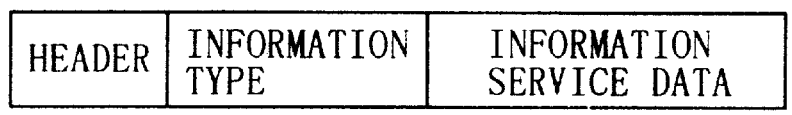
FIG. 7 is a schematic diagram showing the structure of an information service packet.

Further, as described above, the information service data S2 or S4 is transmitted using a dedicated code channel or a traffic channel, wherein the information service data S2 or S4 is transmitted with the packet data form shown in FIG. 7. In this event, the information service packet is formed of a header, an information type field, and an information service data field. The information type field contains a code indicative of provided information which is related to the information service packet. The information service data field contains information data itself to be provided.

Figure 8:
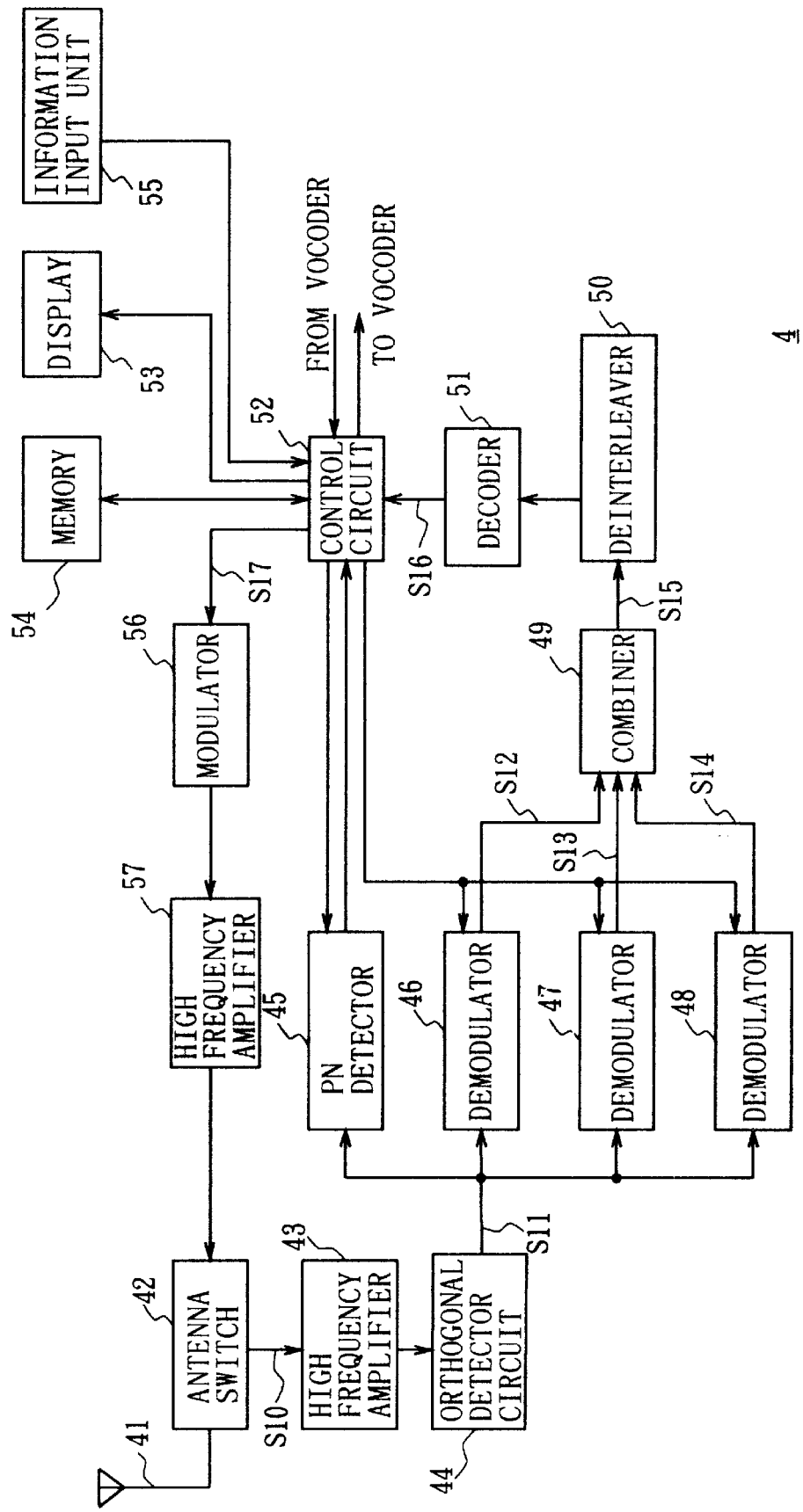
FIG. 8 is a block diagram showing the configuration of a mobile terminal apparatus.

Next, the configuration of the mobile terminal apparatus 4 will be described with reference to FIG. 8. In the mobile terminal apparatus 4, a received signal S10 received by an antenna 41 is supplied to a high frequency amplifier 43 through an antenna switch 42 to be amplified. The amplified received signal is then supplied to an orthogonal detector circuit 44. The orthogonal detector circuit 44 orthogonally detects the received signal S10 to obtain a baseband signal S11, and then supplies the baseband signal S11 to a PN detector 45 and demodulators 46 to 48.

The PN detector 45 detects a pilot PN code from the baseband signal S11 in response to an instruction from a control circuit 52, and informs the control circuit 52 of the detection results (the timing of the PN code and so on). The control circuit 52, upon receiving the detection results, transmits control signals to the demodulators 46 to 48 such that the demodulators 46 to 48 operate at a plurality of PN code timings detected by the PN detector 45. The reason why the demodulators 46 to 48 are operated at different timings from each other is that multipath generally exists in a transmission path and a PN code is detected at a plurality of timings. Thus, if multipath exists, the plurality of demodulators which respectively corresponds to a plurality of paths are operated at different timings from each other for demodulation, thereby avoiding the influence of the multipath.

Demodulated results (S12 to S14) produced by the respective demodulators 46 to 48 are supplied to a combiner 49 to be summed at the same timing. Thereby, received data S15 having a large signal-to-noise ratio and a large signal-to-interference ratio is demodulated. The received data S15 is supplied to a deinterleaver 50 to be rearranged in the original order and then supplied to a decoder 51. The decoder 51 performs Viterbi decoding and error correction on the supplied received data to obtain received data S16. The received data S16 is supplied to the control circuit 52.

Here, if the received data S16 is speech data, the control circuit 52 supplies the received data S16 to a vocoder (not shown) which functions as a speech encoder/decoder. Consequently, a speech signal is decoded from the received data S16 and outputted from a speaker (not shown). Further, if the received data S16 is the information index data Si, the control circuit 52 supplies the received data S16 to a display 53. Consequently, the status of information being provided is displayed on the display 53. Furthermore, if the received data S16 is the information service data S2 or S4, the control circuit 52 supplies the received data S16 to a memory 54 for storage and to the display 53. Consequently, information being provided is displayed on the display 53.

Note that, when the information index data S1 is supplied to the display 53 to display the status of provided information thereon, the user operates an information input unit 55 monitoring the displayed status. When the user inputs a display instruction for displaying desired information, the control circuit 52 receives an information service channel in response to the display instruction, or acquires the information service data S2 or S4 on the instructed information through a line connected to the information service center 2 to supply it to the display 53 for display. If the information index data S1 indicates that the information instructed by the user has not been updated, the control circuit 52 reads the instructed information from the memory 54, and supplies the read information to the display 53 for display.

On the other hand, in the case of transmitting data, the control circuit 52 supplies data to be transmitted to a modulator unit 56 as transmitted data S17. In this event, the data to be transmitted may be, for example, speech data supplied from the vocoder, a variety of control data to be transmitted to the control station apparatus 9 of the cellular network 3, or data such as the transmission request S3, identification information S5, and information acquisition report S6 to be transmitted to the information service center 2.

The modulator unit 56 performs spread spectrum and offset quadrature phase shift keying (QPSK) modulation on the transmitted data S17. The resulting modulated signal is supplied to the high frequency amplifier 57 to be amplified to a desired power level, and then supplied to the antenna 41 through the antenna switch 42 in order to be radiated to the base station apparatuses.

Figure 9:
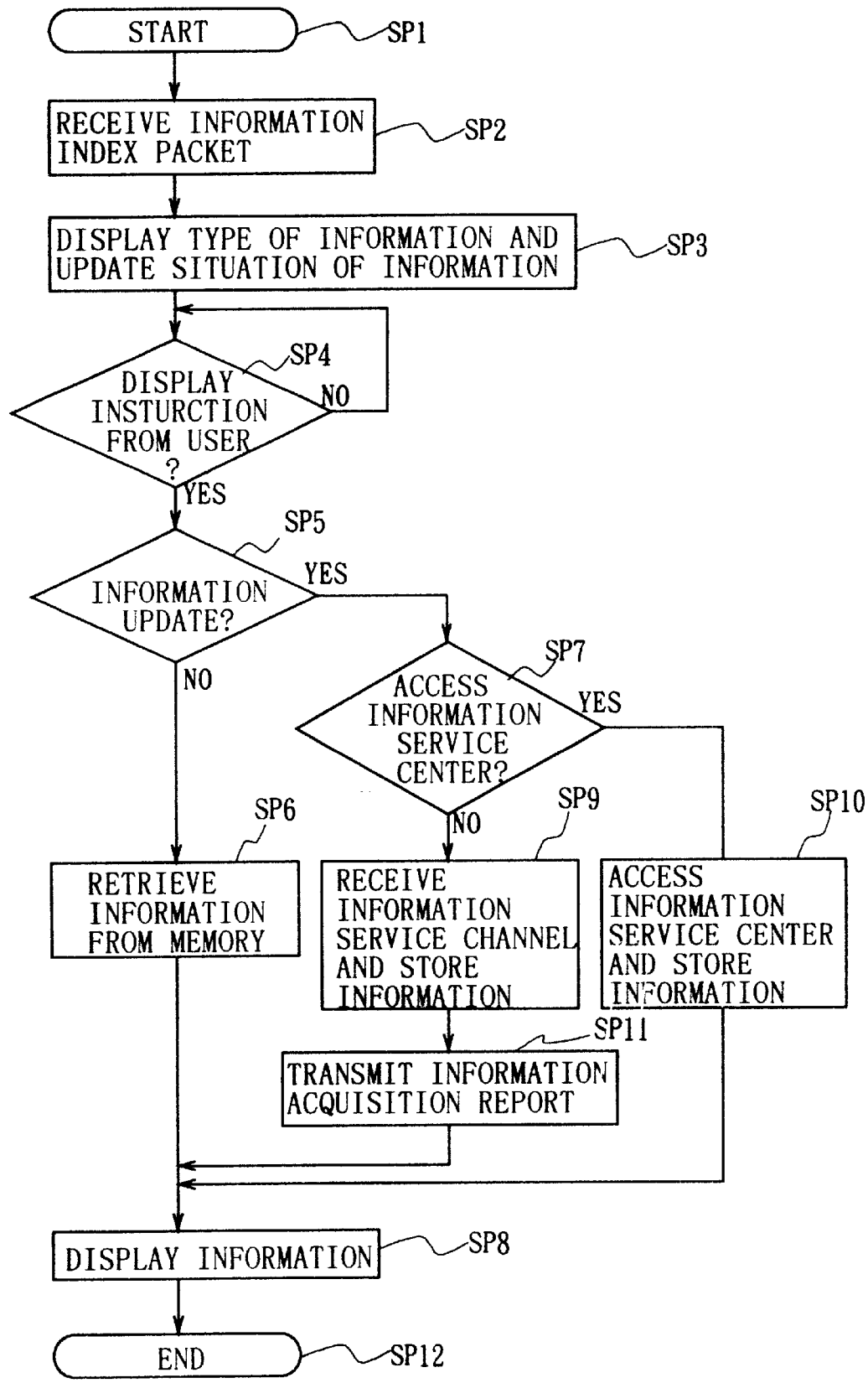
FIG. 9 is a flowchart showing an operational procedure of the mobile terminal apparatus.

Next, an operational procedure executed by the mobile terminal apparatus 4 at the time of receiving the information provision service will be described with reference to the flow chart shown in FIG. 9. In the beginning, at step SP2, the control circuit 52 receives a paging channel which is transmitted from a base station apparatus to receive an information index packet. In this event, the information index packet includes the type of provided information, update information on each information, an information providing method, and so on, as described above. Therefore, the control circuit 52 can acquire such information by receiving the information index packet. Next, at step SP3, the control circuit 52 supplies the display 53 with the type of information, the update status of the information, and so on, acquired from the information index packet, to display the data.

At next step SP4, the control circuit 52 waits for a display instruction which is inputted by the user's operation. As a result, when the user inputs a display instruction for displaying desired information, the procedure proceeds to next step SP5. At step SP5, the control circuit 52 checks whether or not the instructed information has been updated. The procedure proceeds to step SP6 if not updated, and proceeds to step SP7 if updated.

At step SP6, previously received information is read from the memory 54. At next step SP8, the control circuit 52 supplies the read information to the display 53 to display it. In this connection, it will be understood that the instructed information has not been received even if the instructed information has been updated, the procedure proceeds to step SP7 to receive the information.

At step SP7, the control circuit 52 checks the providing method of the instructed information on the basis of the previously received information index packet. Specifically, the control circuit 52 checks whether the instructed information is repeatedly transmitted through a dedicated information service channel or acquires through a line connected to the information service center 2. As a result, the procedure proceeds to step SP9 when the instructed information is transmitted through the dedicated information service channel, and proceeds to step SP10 when it is acquired through a line connected to the information service center 2.

At step SP9, the control circuit 52 receives the information service packet by receiving the information service channel, thereby acquiring the instructed information. the acquired information is stored in the memory 54. At next step SP11, the control circuit 52 reports the information service center 2 that it has received the provided information by receiving the information service channel. Specifically, a radio line is established between the mobile terminal apparatus 4 and the base station apparatus through a traffic channel and a communication line is established between the base station apparatus and the information service center 2, in order to connect with the information service center 2. Then, the mobile terminal apparatus 4 transmits the identification number S5 thereof and the information acquisition report S6 indicative of the purpose of the line connection and information acquired thereby. Thus, the information service center 2 can charge account to the mobile terminal apparatus 4 based on the transmitted data S5 and S6.

Then, the procedure proceeds to step SP8, the control circuit 52 supplies the received information to the display 53 to display.

On the other hand, at step SP10, the control circuit 52 acquires the instructed information through a line connected to the information service center 2 and stores the received information in the memory 54. More specifically, a radio line is established between the mobile terminal apparatus 4 and the base station apparatus through a traffic channel and a communication line is established between the base station apparatus and the information service center 2, in order to connect with the information service center 2. Then, the mobile terminal apparatus 4 transmits the identification number S5 thereof and a transmission request S3 including the type of desired information to the information service center 2. When the information service center 2 transmits the requested information as an information service packet in response to the transmission request S3, the mobile terminal apparatus 4 can acquire the information instructed by the user.

Then, the procedure proceeds to step SP8, the control circuit 52 supplies the received information to the display 53 to display.

In this case, the information service center 2 also charges account to the mobile terminal apparatus 4, which has received the information, based on the identification number S5.

Figure 10:
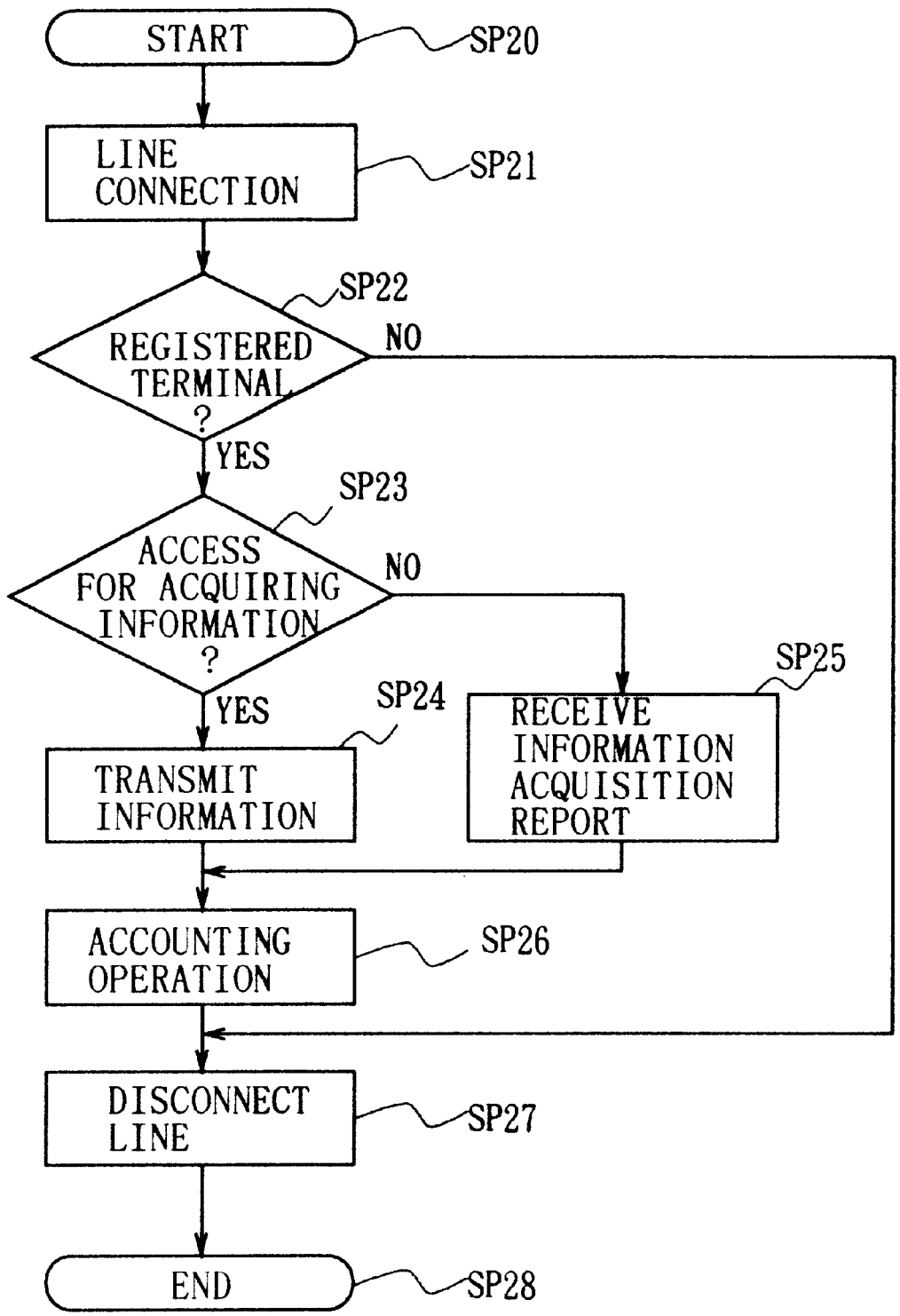
FIG. 10 is a flowchart showing an operational procedure of the information service center.

Next, an operational procedure executed by the information service center 2 when connected with the mobile terminal apparatus 4 through a line will be described with reference to the flowchart shown in FIG. 10. At step SP21, a line connection is made with the mobile terminal apparatus 4. Then, at next step SP22, the central processing unit 6 determines based on the identification number S5 transmitted from the mobile terminal apparatus 4 whether or not the mobile terminal apparatus 4 has been registered. As a result, the procedure proceeds to next step SP23 if the mobile terminal apparatus 4 has been registered, and proceeds to step SP27 if not registered, where the line is disconnected.

At step SP23, the central processing unit 6 determines the purpose of the line connection on the basis of information indicating the purpose of the line connection or a transmission request S3 transmitted from the mobile terminal apparatus 4. As a result of the determination, the procedure proceeds to step SP24 when the line connection has been made to receive information, and proceeds to step SP25 when the line connection has been made to transmit an information acquisition report.

At step SP24, the central processing unit 6 reads requested information from the data storage unit 5 based on the transmission request S3, and transmits the read information to the mobile terminal apparatus 4.

On the other hand, at step SP25, the central processing unit 6 receives the information acquisition report S6 (i.e., report indicating that the mobile terminal apparatus has acquired provided information by receiving an information service channel) transmitted from the mobile terminal apparatus 4.

At step SP26, the central processing unit 6 charges account to the mobile terminal apparatus 4, to which the information has been provided, based on the previously received identification number S5 and information acquisition report S6. Specifically, when the mobile terminal apparatus 4 has received information through an information service channel, the central processing unit 6 charges account to the mobile terminal apparatus 4 based on the identification number S5 and the information acquisition report S6. When the mobile terminal apparatus 4 has received information through a line connection, the central processing unit 6 charges account depending on the information provided based on the identification number S5.

When the account operation is terminated, the procedure proceeds to next step SP27, the central processing unit 6 disconnects the line, and then the procedure is terminated at next step SP28.

As an example of the account operation, a utilization status may be totaled for each mobile terminal apparatus in months such that the rates are collected at the end of each month from a user's account.

In the information provision system 1 according to this embodiment configured as described above, first of all, each of the base station apparatuses repeatedly transmits an information index packet (information index data S1), indicating whether or not provided information has been updated, using a paging channel. The mobile terminal apparatus 4 receives the information index packets in the intervals of receiving paging messages (information for the communication service such as call arrival information), for example, approximately once per ten minutes. The mobile terminal apparatus 4 displays the update status of an information acquired from the information index packet on the display 53. The user, viewing the display, operates the information input unit 55. When the user inputs a display instruction for displaying desired information, the mobile terminal apparatus 4 acquires the instructed information in response to the display instruction by receiving an information service channel or through a line connected to the information service center 2, and supplies the acquired information to the display 53 to display. However, in the case where the instructed information has not been updated and the previously received same information is stored in the memory 54, the stored information is read from the memory 54 and displayed on the display 53 without performing the receiving operation.

In this way, since the information index packet indicating whether or not information has been updated is transmitted, in this embodiment, the mobile terminal apparatus 4 can easily know whether or not information has been updated. If it can be known whether information has been updated, the receiving operation is required only when the information index packet indicates that information has been updated, in response to a display instruction inputted from the user. It is therefore possible to reduce the number of times of receiving operations to increase the efficiency of the information provision service.

Further, in this embodiment, since the information provision service is offered only when the user inputs a display instruction, the information provision service can be offered in response to the intention of the user, and the number of times of receiving operations can be reduced as compared with an automatic reception scheme for automatically receiving provided information, thereby making it possible to further improving the usability of the information provision service.

Further, in this embodiment, when the mobile terminal apparatus 4 receives information repeatedly transmitted through the information service channel, the mobile terminal apparatus 4 transmits the information acquisition report S6 to the information service center 2, so that the information service center 2 can easily determine an information acquisition status of the mobile terminal apparatus 4 and can easily charge account to the mobile terminal apparatus 4. The reason is because when information is provided through the information service channel, the mobile terminal apparatus 4 can acquire information only by the receiving operation, so that the information service center 2 cannot entirely monitor the information acquisition status and may fail to charge account to the mobile terminal apparatus 4. However, in this embodiment, since the mobile terminal apparatus 4 sends the information acquisition report S6 upon receiving information, such an account problem can be solved.

Further, in this embodiment, highly frequently received information is transmitted through the information service channel which is a dedicated code channel, so that highly demanded information can be efficiently transmitted. If highly frequently received information were transmitted through a line connection, a traffic channel would be occupied by the information provision service, thereby possibly impeding the essential communication service. However, this embodiment solves such a problem and allows for an efficient utilization of the radio line.

Further, less frequently received information is transmitted using a traffic channel through a line connected to the information service center 2, so that less demanded information can be efficiently transmitted. If less frequently received information were repeatedly transmitted using a dedicated code channel, the code channel would be possibly occupied excessively. However, this embodiment can also avoid such a problem and allows for an efficient utilization of the code channel.

According to this embodiment, update information on provided service (specifically, the type of information and a version number indicative of the number of revisions) is periodically transmitted using a CDMA paging channel or a dedicated code channel, and the mobile terminal apparatus (4) receives the update information. Then, the mobile terminal apparatus displays the received update information on the predetermined display means (53) to notify the user of the status of information being provided. As a result, if the user manipulates the input means (55) to input an instruction to display the provided information, the mobile terminal apparatus acquires the instructed information by receiving the information transmitted through a code channel for the information provision or through a line connected to the information service center, and displays the received information on the display means. In addition, the received information is stored in the predetermined storage means (54) such that the information stored in the storage means is read for display when the user inputs the same display instruction next time if the information has not been updated. By offering the information provision service as described above, this embodiment realizes an improved usability and a high efficiency for the service.

According to the aforementioned configuration, the base station apparatus transmits the information index packet indicating whether or not information to be provided has been updated, so that the mobile terminal apparatus 4 needs to receive information service data S2 or S4 in response to a display instruction inputted by the user, only when the instructed information has been updated, thus making it possible to improve the usability and efficiency of the information provision service.

Further, since highly frequently received information is transmitted using a dedicated code channel while less frequently received information is transmitted through a line connected to the information service center 2, the radio line can be efficiently used for conducting the information provision service.

Note that, according to the aforementioned embodiment, the information index packet (information index data S1) is transmitted using a paging channel, however, the present invention is not limited thereto and a dedicated code channel can be used for transmitting the information index packet when the amount of traffic is large. In this case, a dedicated information index channel can be provided as a transmitter unit 60 of each base station apparatus such that this channel is used for transmitting the information index packet. In this way, the information index packet can be reliably transmitted even if the amount of traffic on the paging channel is large due to the essential communication service.

In this connection, in this case, each base station apparatus receives reception slots periodically transmitted and examines whether or not a paging message is forwarded thereto. If there is no paging message forwarded thereto, the code channel for reception can be switched from the paging channel to the information index channel to receive the information index packet at the timing at which the information index packet is received.

Further, while in the aforementioned embodiment, one type of provided information is received, however, the present invention is not limited thereto and a plurality of types of information can be received at the same time. In this case, a plurality of types of information instructed by the user are listed up, and update information and information providing methods are checked for the respective information in order to sequentially receive the respective information in accordance with the check results. However, in this case, if instructed information has not been updated and stored in the memory 54 during a previous receiving operation, the stored information can be read from the memory 54. Further, in this case, information to be received can be classified in accordance with information providing methods so as to collectively acquire information provided by the same providing method.

Further, while in the aforementioned embodiment, provided information is received and displayed on the display 53 as character information, however, the present invention is not limited thereto and if provided information is in the form of speech data, a speaker can be used for outputting the information as sound.

Further, while in the aforementioned embodiment, a method of transmitting provided information using a dedicated information service channel and a method of transmitting provided information by connecting a line are combined, however, the present invention is not limited thereto and either one of these methods can be used for transmitting provided information.

Further, while in the aforementioned embodiment, the information providing source is divided into the information service center 2 and the cellular network 3, however, the present invention is not limited thereto and the cellular network can include the information service center. In other words, the information service center is not limited at all in configuration or in position.

Furthermore, while in the aforementioned embodiment, the information provision service in a CDMA cellular to which the present invention is applied, however, the present invention is not limited thereto and can also be applied to an information provision service conducted in a radio communication system which makes radio communications between base station apparatuses and mobile terminal apparatuses in accordance with a code division multiple access scheme. In any case, similar effects to the above mentioned can be obtained.

According to the present invention as described above, when an information provision service for providing a variety of information is conducted from an information service center to a mobile radio station in addition to an ordinary communication service, each base station transmits update information indicating whether information to be provided has been updated, and the mobile radio station receives and displays the update information on a predetermined display means to let the user know about the status of the provided information. When the user inputs a display instruction for certain information, the mobile radio station checks based on the update information whether or not the instructed information has been updated. If the instructed information has been updated, the instructed information is newly received and displayed on the display means. The information service center charges account to the mobile radio station which has received information data. Thereby, the times of receiving operations can be reduced and an efficient information provision service can be conducted. Also, since information is received only when the user inputs a display instruction, the usability can be significantly improved for the user as compared with an automatic information receiving system which does not accept user's instruction. Thus, a radio communication system, a method of radio communication for information provision service, and a mobile radio station which can provide a good usability for users and implement an efficient information providing service.

Figure 11:
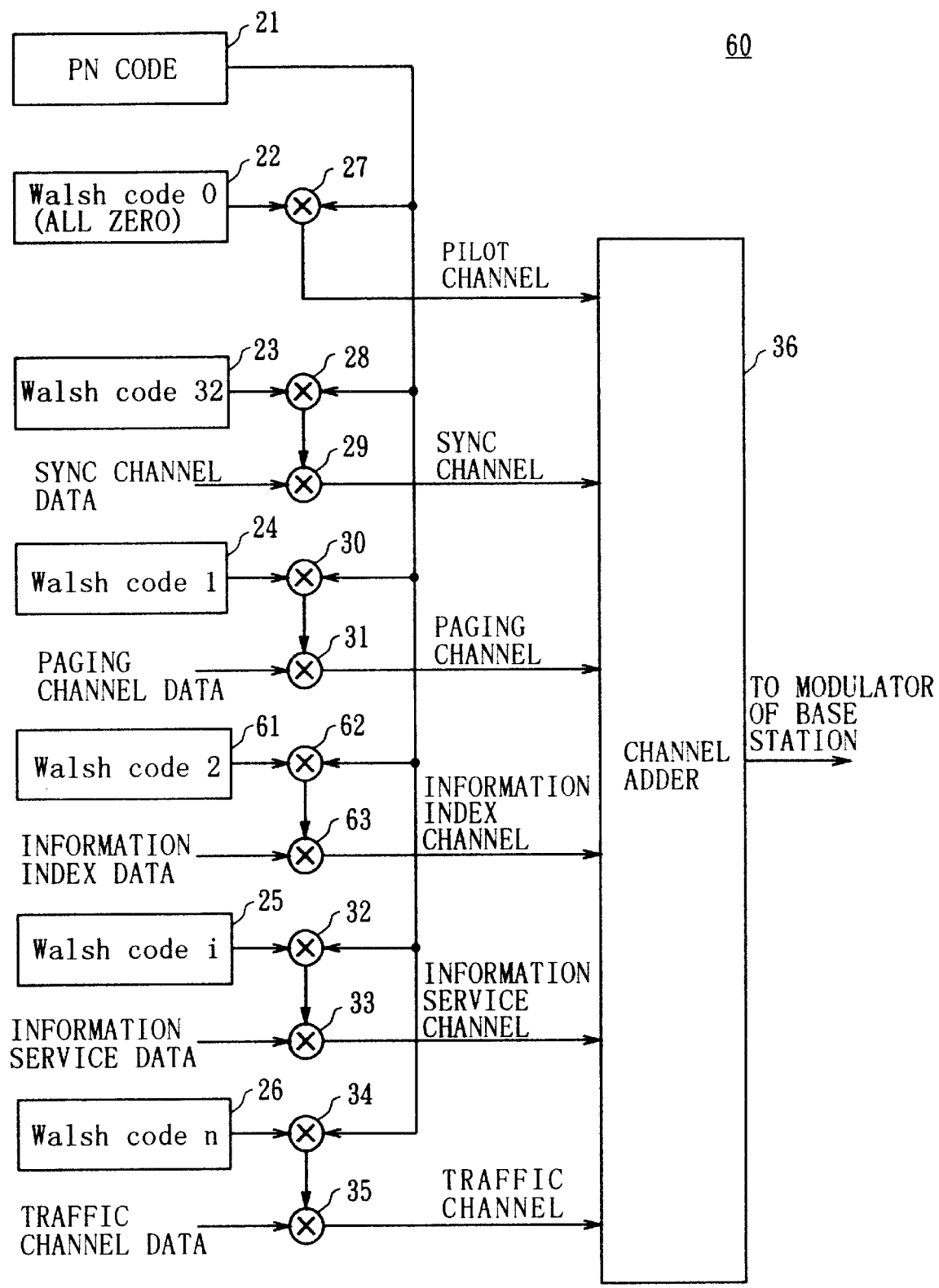
FIG. 11 is a block diagram showing a transmitter unit of a base station apparatus according to another embodiment.

FIG. 11 is a block diagram showing a transmitter unit of a base station apparatus according to another embodiment. FIG. 11 is identical to FIG. 5 except that FIG. 11 adds a Walsh code generator 61 that generates a Walsh code having a function number "2" and includes multipliers 62 and 63.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A radio communication system for radio-communicating between a base station and a plurality of mobile radio stations that communicate in accordance with a code division multiple access scheme, said system comprising:

an information service center for supplying to said base station information data including updated news information, updated weather information, and updated stock information for providing information provision service to said at least one of said plurality of mobile radio stations, type data indicating a type of said information data, and update data including version data of said information data; and said plurality of mobile stations including means for receiving said update data transmitted from the base station and for displaying said type data, and when desired selected type data is selected from said displayed type data by a user's operation, for judging that said corresponding information data is latest information data based on said version data corresponding to said selected type data, and for receiving said information data, wherein said information service center charges an account for reception of said information data by said at least one of said plurality of mobile ratio stations.

2. The radio communication system according to claim 1, wherein said at least one of said plurality of mobile radio stations updates the information data whenever the information data is received thereby and includes storage means for storing said information data, upon judging that said information data is not the latest information data, and means for reading the stored information data from said storage means for display.

3. The radio communication system according to claim 1, wherein said information data is repeatedly transmitted to said at least one of said plurality of mobile radio stations, and when said at least one of said plurality of mobile radio stations judges that said information data is the latest data, said at least one of said plurality of mobile radio stations receives said information data being transmitted and transmits an information acquisition report including identification information to said information service center through said base station, and said information service center charges the account on a basis of said information acquisition report.

4. The radio communication system according to claim 3, wherein said update data is transmitted using a paging channel or a dedicated code channel, and said information data is repeatedly transmitted using a dedicated code channel.

5. The radio communication system according to claim 1, wherein said information data is not normally transmitted to said at least one of said plurality of mobile radio stations, and when said at least one of said plurality of mobile radio stations judges that said information data is the latest information data, said at least one of said plurality of mobile radio stations demands to connect to said information service center of said base station, after connecting, said information service center transmits said information data to said at least one of said plurality of mobile radio stations through said base station in response to an information transmission request including the identification information from said radio communication terminal and charges the account on a basis of said information transmission request.

6. The radio communication system according to claim 5, wherein said update data is transmitted using a paging channel or a dedicated code channel, and said information data is transmitted using a traffic channel.

7. A method of radio communication for information provision service for radio-communicating between a plurality of mobile radio stations and an information service center, which provides an information service to the mobile radio station, through a base station in accordance with a multiple division access scheme, comprising the steps of:

supplying information data including updated news information, updated weather information, and updated stock information for providing said information provision service, type data indicating the type of the information data, and update including version data of said information data to said base station by said information service center;

receiving said update data transmitted from the base station and displaying said type data by at least one of said mobile radio stations, when desired selected type data is selected from said displayed type data by a user's operation, and, upon judging that said corresponding information data is latest information data based on said version data corresponding to said selected type data, receiving said information data; and charging an account by said information service center for the reception of said information data by said at least one of said plurality of mobile radio stations.

8. The method of radio communication for information provision service according to claim 7, further comprising the steps of:

updating the information data whenever information is received and storing said information data by said at least one of said Plurality of mobile radio stations, when it is judged that said information data is not the latest information data, reading the stored information data and displaying it by said at least one of said plurality of mobile radio stations.

9. The method of radio communication for information provision service according to claim 7, further comprising the steps of:

transmitting repeatedly said information data to said at least one of said mobile radio stations, when said at least one of said plurality of mobile radio stations judges that said information data is the latest information data, receiving said information data being transmitted and transmitting an information acquisition report including identification information to said information service center through said base station by said at least one of said plurality of mobile radio stations, and charging the account on a basis of said information acquisition report by said information service center.

10. The method of radio communication for information provision service according to claim 7, further comprising the following steps of:

transmitting said information data to said at least one of said plurality of mobile radio stations, when said at least one of said plurality of mobile radio stations judges that said information data is the latest information data, demanding to connect to said information service center of said base station by said at least one of said plurality of mobile radio stations, after connecting, transmitting said information data to said at least one of said plurality of mobile radio stations through said base station in response to an information transmission request including identification information from said radio communication terminal and charging the account on a basis of said information transmission request by said information service center.

11. A mobile radio station for radio-communicating with a base station in accordance with a code division multiple access scheme and receiving information data for information provision service, type data indicating a type of information data, and update data including version data of said information data from an information service center through said base station, said mobile radio station comprising:

communication means for radio-communicating with said base station;

display means for displaying at least reception information;

input means for inputting a selective instruction; and control means for receiving said update data from said communication means and displaying said type data on said display means, when desired selected type data is selected from said displayed type data by user's operation, and if it is judged that said corresponding information data is latest information data based on said version data corresponding to said selected type data, receiving and displaying said information data on said display means, and for transmitting information for charging an account to reception of said information data of said mobile radio station by said information service center to said information service center through said base station, wherein said information data provided by said information provision service includes updated news information, updated weather information, and updated stock information.

12. The mobile radio station according to claim 11, wherein said mobile radio station updates information data whenever the information data is received and further comprising storage means for storing said information data, and wherein when it is judged that said information data is not the latest information data, said mobile radio station reads the stored information data from said storage means to display said stored information data on said display means.

13. The mobile radio station according to claim 11, wherein said information data is repeatedly transmitted to said mobile radio station, and said control means receives said information data and then transmits an information acquisition report including identification information used for charging the account in said information service center.

14. The mobile radio station according to claim 11, wherein said information data is not normally transmitted to said mobile radio station, when said control means judges that said information data is the latest information data, and said control means transmits an information transmission request for requiring a transmission of information data to said information service center including identification information used for charging the account in said information service center.

* * * * *